United States Patent [19]

Solomon

[11] Patent Number: 4,468,362
[45] Date of Patent: Aug. 28, 1984

[54] METHOD OF PREPARING AN ELECTRODE BACKING LAYER

[75] Inventor: Frank Solomon, Great Neck, N.Y.

[73] Assignee: Diamond Shamrock Corporation, Dallas, Tex.

[21] Appl. No.: 451,407

[22] Filed: Dec. 20, 1982

Related U.S. Application Data

[63] Continuation-in-part of Ser. No. 202,575, Oct. 31, 1980, abandoned.

[51] Int. Cl.$^3$ .............................................. B27J 5/00
[52] U.S. Cl. .................................... 264/127; 264/122; 264/112
[58] Field of Search ....................... 264/112, 122, 127

[56] References Cited

U.S. PATENT DOCUMENTS

| | | | |
|---|---|---|---|
| 2,782,180 | 2/1957 | Weidman | 264/127 |
| 3,281,511 | 10/1966 | Goldsmith | 264/127 |
| 3,385,780 | 5/1968 | Feng | 204/294 |
| 4,042,747 | 8/1977 | Breton et al. | 264/122 |

OTHER PUBLICATIONS

Advances in Chemistry Series, R. F. Gould, Editor, Amer. Chem. Soc., (1969), A Novel Air Electrode, Landi et al, pp. 13–23.

*Primary Examiner*—James R. Hall
*Attorney, Agent, or Firm*—Arthur S. Collins; Bruce E. Harang

[57] ABSTRACT

This disclosure is directed to the preparation of a self-sustaining hydrophobic backing layer which also possesses excellent electrical conductivity so that it can serve as an intermediate layer between the current distributor and the active layer of a complete oxygen cathode. Said backing layer is formed by a simple process in which an intimate liquid dispersion containing finely divided carbon black and not more than equal parts by weight of PTFE particles ranging in size from about 0.05 to about 0.5 microns is dewatered and shaped into a thin layer which is thereafter lightly pressed and consolidated at elevated temperatures. Preferably, the carbon black is an acetylene black of a particle size range between 50 and 3000 Angstroms and the weight proportion of same is greater than the PTFE.

9 Claims, No Drawings

METHOD OF PREPARING AN ELECTRODE BACKING LAYER

This application is a continuation-in-part of U.S. Ser. No. 202,575 filed on Oct. 31, 1980, and subsequently abandoned.

BACKGROUND OF THE INVENTION

In the field of electrochemistry there is a well-known electrochemical cell known as a chlor-alkali cell. In this cell, an electric current is passed through a saturated brine (sodium chloride salt) solution to produce chlorine gas and caustic soda (sodium hydroxide). A large portion of the chlorine and caustic soda for the chemical and plastics industries are produced in chlor-alkali cells.

Such cells are divided by a separator into anode and cathode compartments. The separator characteristically can be a substantially hydraulically impermeable membrane, e.g., a hydraulically impermeable cation exchange membrane, such as that commercially available under the trademark NAFION manufactured by the E. I. du Pont de Nemours & Company. Alternatively, the separator can be a porous diaphragm, e.g., asbestos, which can be in the form of vacuum deposited fibers or asbestos paper sheet as are well known in the art. The anode can be a valve metal, e.g., titanium, provided with a noble metal coating to yield what is known in the art as a dimensionally stable anode.

One of the unwanted by-products present in a chlor-alkali cell is hydrogen which forms at the cell cathode. This hydrogen increases the power requirement for the overall electrochemical process, and eliminating its formation is one of the desired results in chlor-alkali cell operation.

It has been estimated that 25 percent of the electrical energy required to operate a chlor-alkali cell is utilized due to the formation of hydrogen at the cathode. Hence, the prevention of hydrogen formation, e.g., by reacting water with oxygen at the cathode resulting in the formation of hydroxide, can lead to substantial savings in the cost of electricity required to operate the cell. In fairly recent attempts to achieve cost savings and energy savings in respect of operating chlor-alkali cells, attention has been directed to various forms of what are known as oxygen (air) cathodes. These cathodes prevent the formation of molecular hydrogen at the cathode and instead reduce oxygen to form hydroxyl ions. Savings in cost for electrical energy are thereby achieved.

One known form of oxygen (air) cathode involves use of an active layer containing porous active carbon particles whose activity in promoting the formation of hydroxide may or may not be catalyzed (enhanced) using precious metal catalysts, such as silver, platinum, etc. Unfortunately, however, the pores of such active carbon particles may become flooded with the caustic soda thereby significantly reducing their ability to catalyze the reduction of oxygen at the air cathode and resulting in decreased operating efficiency. In an attempt to overcome these difficulties in flooding of the active carbon, hydrophobic materials, e.g., polytetrafluoroethylene (PTFE), have been employed in particulate or fibrillated (greatly attenuated and elongated) form to impart hydrophobicity to the active carbon layer, per se, and/or to a protective (wetproofing) or backing sheet which can be laminated or otherwise attached to the active layer. Thus, PTFE has been employed in both active layers and in backing (wetproofing) layers secured thereto. Such active carbon-containing layers, however, are subjected to loss of strength resulting in failure combined with blistering thereof when the chlor-alkali cell is operated at high current densities, viz., current densities of about 250 milliamperes/cm$^2$ and higher for prolonged time periods.

It is customary to employ porous carbon particles (with or without precious metal catalyst deposited thereon) as the active catalyst material in the so-called active layer of electrodes utilized in such a chlor-alkali cell. One problem which has been encountered in the use of catalyzed or uncatalyzed porous carbon particles in the active layer is that they tend to become wetted by (and therefore have their catalytic activity severely diminished by) the catholyte liquor, viz., the caustic soda (sodium hydroxide). Various attempts have been made to solve this wetability problem. By providing a backing layer which is porous and hydrophobic, wetting of the back of the active layer by caustic soda may be prevented thus allowing continuous access of oxygen to the active layer. Various forms of polytetrafluoroethylene (PTFE) have been utilized for such an electrode backing. PTFE, however, is not electrically conductive, precluding electrically contacting the active layer through the hydrophobic PTFE porous backing layer.

FIELD OF THE INVENTION

The primary field to which this invention is directed is the preparation of an electrically conductive yet hydrophobic backing layer which can be used in direct association with an active carbon particle-containing active layer which serves as a component of an oxygen (air) cathode in a chlor-alkali cell or a cell wherein an electrochemical reaction takes place, e.g., fuel cell, metal-air battery, etc.

PRIOR ART

U.S. Pat. No. 3,385,780 to I-Ming Feng discloses a thin, porous electrode consisting of a thin layer of a polytetrafluoroethylene pressed against a thin layer of polytetrafluoroethylene containing finely divided platinized carbon, the platinum being present in amounts of 1.2 to 0.1 milligrams per square centimeter in the electrically conductive face of the thin electrode, viz., the side containing the platinized carbon, viz., the active layer. It will be apparent that the backing layer in the Ming Feng patent is polytetrafluoroethylene, per se. Such a layer is not conductive. While U.S. Pat. No. 3,385,780 mentions a single unit electrode involving finely divided carbon in mixture with PTFE in the single layer, there is no specific disclosure of using carbon black or the use of a conductive backing layer.

SUMMARY OF THE INVENTION

Briefly described, the current invention relates to methods for preparing an electrically conductive, hydrophobic, gas permeable, cohesive electrode wetproofing sheet for use in forming an oxygen cathode.

The current consuming electrochemical reactions take place in the active layer which is contiguous with said wetproofing sheet in an oxygen cathode. The active layer is placed in contact with the liquid electrolyte of the electrochemical cell employing said oxygen cathode while the conductive, gas permeable, wetproof layer is in contact with a gas phase from whence diffuse the reactant gases to the active layer of the oxygen cathode. Liquid seepage to the gas side is prevented by said wetproof layer.

A suitable current distributor may make electrical contact on the gas side of said oxygen cathode, current being transmitted to the active layer through the conductive, gas permeable, wetproofing sheet.

This arrangement is especially advantageous in permitting the use of lower cost current distributor materials than would be possible were the current distributor to be placed on the active layer-liquid electrolyte side of the oxygen cathode.

One method for forming an electrically conductive hydrophobic, gas permeable electrode wetproofing sheet comprises the steps of (a) making a first dispersion comprising water and carbon black, (b) intimately mixing into said first dispersion a second dispersion comprising water, wetting agent and PTFE particles, thereby producing an intimate mixture of carbon black and PTFE particles dispersed in water, (c) removing the water of said intimate mixture by a drying means, thereby producing an intimately mixed dried mass of carbon black and PTFE, (d) removing said wetting agent from said mass by a heating or extraction means, (e) fragmenting said dried mass to provide a granulated mixture, and (f) passing said granulated mixture through heated rollers, in a single pass, at a temperature of between 65° and 90° C., thereby producing said wetproofing sheet. In a variation of this method removal of the wetting agent by heating may be carried out after step (e).

The currently preferred embodiment of the invention may be briefly described as a method for preparing an electrically conductive, hydrophobic, cohesive, self-sustaining electrode wetproofing sheet for use in forming any oxygen cathode comprising the steps of (a) making a first dispersion comprising water and carbon black, (b) intimately mixing into said first dispersion a second dispersion comprising water, wetting agent and PTFE particles, thereby producing an intimate mixture of carbon black and PTFE particles dispersed in water, (c) removing the water of said intimate mixture by filtering and washing with alcohol, thereby producing an intimately mixed, substantially water free filter cake of carbon black and PTFE, (d) dispersing said filter cake in alcohol, (e) filtering the dispersion of step (d) through a flat filter treated with a salt thereby forming a layer of intimately mixed carbon black and PTFE on top of the salt treated filter, (f) placing a current distributor, such as a woven or expanded metal screen on the filtered carbon black and PTFE layer and filter, and drying the composite sheet thus formed, utilizing heating and pressing means, (g) washing said composite sheet and filter of step (f) with water and thereby removing said filter from said composite sheet as well as cleansing said composite sheet of the salt, resulting in a clean composite sheet, (h) drying said clean composite sheet utilizing a heating means, (i) driving off the wetting agent utilizing a heating means which is substantially hotter than the heating means of step (h), (j) pressing the resulting dried and wetting agent free composite sheet utilizing elevated pressure and temperature to form a wetproofing sheet of the invention.

It has been found that electrically conductive hydrophobic, gas permeable, electrode wetproofing sheets prepared by the preferred procedure of the invention exhibit the least weeping of electrolyte when used as the wetproof layer of an oxygen cathode.

While satisfactory electrode wetproofing sheets may be produced as has been described hereinabove, it has further been found that the addition of fibrous material to the carbon black and PTFE composition results in a more easily processable material and a stronger and more useful electrode wetproofing layer.

Accordingly, it is preferable to include a suitable proportion of carbon, graphite, or other fibers in the composition of the electrically conductive, hydrophobic, gas permeable, cohesive electrode wet-proofing sheets of the invention.

Said fibers may be incorporated in the CB/PTFE mixture at any time before the wet proofing sheet is formed by passing the granulated mixture through heated rollers or by filtering the mixture.

It is preferable, however, to introduce the fibers before drying the CB/PTFE mixture to assure homogeneous distribution of the fibers.

Thus, fibers may be added at step (a) of the first method or at step (a) or step (d) of the preferred embodiment.

DESCRIPTION OF THE INVENTION

The present invention contemplates the use of carbon black as defined in an article entitled "FUNDAMENTALS OF CARBON BLACK TECHNOLOGY" by Frank Spinelli appearing in the *AMERICAN INK MAKER*, August, 1970. Carbon black is a generic term referring to a family of industrial carbons which includes lampblacks, channel blacks, furnace blacks and thermal blacks. In general, carbon black is made by incomplete combustion or thermal decomposition of a liquid or gaseous hydrocarbon. A preferred class of carbon blacks are the acetylene carbon blacks, e.g., made from acetylene by continuous thermal decomposition, explosion, by combustion in an oxygen-deficient atmosphere, or by various electrical processes. Characteristically, these acetylene blacks contain 99.5+ weight percent carbon and have a particle size ranging from about 50 to about 2000 Angstrom units. The true density of the acetylene black material is approximately 1.95 grams per cubic centimeter. More preferably, the acetylene black is a commercially available acetylene black known by the trademark "Blace" sometimes refered to herin as "SB" and has an average particle size of about 425 Angstroms. Such acetylene blacks are somewhat hydrophobic, e.g., as demonstrated by the fact that the particles therof float on cold water but quickly sink in hot water.

The hydrophobic electroconductive electrode backing layers were prepared in accordance with this invention by combining the PTFE in particulate form as a dispersion with the acetylene black particles as described above. According to a preferred embodiment of this invention, the acetylene black employed is that having an average particle size of approximately 425 Angstrom units with a standard deviation of 250 Angstrom units. The range of particle size is from about 50 to about 2000 Angstroms.

Hydrophobic electroconductive electrode backing (wetproofing) layers were prepared in accordance with this invention by combining the PTFE in particulate form as a dispersion with the carbon black particles.

"Shawinigan Black" (acetylene carbon black) was suspended in hot water and placed in an ultrasonic generator. Gradually a dilute aqueous dispersion of PTFE (obtained from a concentrated latex sold by du Pont under the tradename "TEFLON 30"), containing 2 weight percent PTFE, was added thereto to form an intimate mixture of suspended solids, which mixture can contain from about 50 to about 80 weight percent carbon black and from about 20 to 50 weight percent PTFE. This mixture may optionally contain 5 to 50 weight percent of fibers based upon the combined weight of fibers carbon black and PTFE. This mixture was then filtered, dried, treated to remove the PTFE wetting agent (by heating at 300° C. for 20 minutes in air or extracting it with chloroform) resulting in a mass of material which was briefly chopped to form a granular mix and then fabricated into sheet form either by (a) passing between heated rollers (65° to 90° C.) or (b) by dispersion of said PTFE/carbon black particles in a liquid dispersion medium capable of wetting said particles and filtration on a salt bed previously deposited on filter paper or like filtration media, and drying to yield a fine-pore wetproofing layer.

In another, and preferred, procedure, "Shawinigan Black" was combined with TEFLON as hereinabove described and then washed substantially free of water with isopropyl alcohol which was then filtered. The resultant filter cake was then redispersed in alcohol without drying and filtered on a salt impregnated filter paper to form a layer. A wire mesh current distributor was placed on the filtered layer and the composite assembly was dried while subjected to sufficient pressure to form a consolidated, dry composite sheet.

A composite sheet was made by the preferred procedure, adding graphite fibers equal in weight to the weight of SB/PTFE mixture during the redispersal step prior to filtering the wetproofing layer as hereinabove described.

In any case, a pore-former can be incorporated into the carbon black/PTFE mix prior to forming the wetproofing layer or sheet, but a pore-former need not be used to obtain a porous sheet. The pore-former can be of the soluble type, e.g., sodium carbonate or the like or the volatile type, e.g., ammonium benzoate or the like. The use of ammonium benzoate as a fugitive, volatile pore-former is described and claimed in U.S. patent application Ser. No. 202,583, filed in the name of Frank Solomon on Oct. 31, 1980. The disclosure of this application is incorporated herein by reference.

Whether the wetproofing sheet is formed by rolling, filtration or spraying, the pore-former can be removed by washing (if a soluble one) or heating (if a volatile one) either prior to laminating the wetproofing layer to the current distributor (with the distributor on the gas side) and active layer, or after lamination thereof. In cases where a soluble pore-former is used, the laminate is preferably given a hot 50° to about 100° C. soak in an alkylene polyol, e.g., ethylene glycol or the like, prior to water washing for 10 to 60 minutes. The ethylene glycol hot soak combined with water washing imparts enhanced resistance of such laminated electrodes to blistering during water washing and is the subject matter described and claimed in U.S. patent application Ser. No. 202,573 entitled "Electrode Layer Treating Process" and filed on Oct. 31, 1980, in the name of Frank Solomon. The disclosure of this application is incorporated herein by reference.

When the wetproofing layer is formed by filtration, it may be consolidated and dried by the simultaneous application of heat and pressure and released from the filter medium by washing with water to dissolve the salt bed, followed by laminating to the current distributor and active layer.

Preferably, the filter paper/salt/wetproofing layer assembly can be laminated to the current distributor (with the filter paper side away from the current distributor and the wetproofing layer side in contact with the current distributor) followed by dissolving the salt away, and finally, laminating the composite sheet so formed to the active layer.

The testing of the electroconductive, hydrophobic backing layers of this invention in the corrosive environment of use of a chlor-alkali cell has revealed a desirable combination of electroconductivity with balanced hydrophobicity and said layer is believed to have achieved a much desired result in the oxygen (air) cathode field.

The invention will be further illustrated in, but in no way limited by, the examples which follow in which parts, percents and ratios are by weight unless otherwise indicated.

EXAMPLE 1

(Preparation of PTFE/Carbon Black)

One and one-half (1.5) grams of "Shawinigan Black," hereinafter referred to as "SB," were suspended in 30 mls of hot water (80° C.) and placed in a small ultrasonic bath (Model 250, RAI Inc.) where it was simultaneously stirred and ultrasonically agitated.

Sixty-eight one hundredths (0.68) ml of duPont "TEFLON 30" aqueous PTFE dispersion was diluted with 20 mls of water and added drop wise from a separatory funnel to the SB dispersion gradually, over approximately a 10-minute period with stirring, followed by further stirring for approximately one hour. This material was then filtered, washed with water and dried at 110° C. The dried material was spread out in a dish and heated at 300° C. in air for 20 minutes to remove the PTFE wetting agent (employed to stabilize PTFE in water dispersion in the first instance).

EXAMPLE 2

(PTFE/SB Wetproofing Layer by Filtration Method)

A PTFE/SB conductive, hydrophobic wetproofing layer or sheet was prepared by the filtration method as follows: two hundred twenty-five (225) milligrams of the PTFE discontinuously coated SB, prepared in accordance with Example 1, were chopped in a small high speed coffee grinder (Varco Model 228-1, made in France) for about 30 to 60 seconds and then dispersed in 250 mls of isopropyl alcohol in a Waring Blender. This dispersion was then filtered onto a "salt paper," viz., NaCl on filter paper, of 19 cm$^2$ area to form a cohesive, self-sustaining wetproofing layer having 10.6 mg/cm$^2$ by weight (200 mg total).

Resistivity of this wetproofing layer was measured and found to be 0.53 ohm-centimeters. The resistivity of pure PTFE (from "TELEFON 30 ") is greater than 10$^{15}$ ohm-cm by way of comparison.

The resistivity of the PTFE/SB carbon black wetproofing layer illustrates that it is still low enough to be useful in forming electrodes when in intimate contact with a current distributor.

Permeability is an important factor in high current density operation of a gas electrode having hydrophobic (conductive or nonconductive) backing, viz., a wetproofing or liquid barrier layer.

The wetproofing layers of this invention have adequate permeability to be comparable to that of pure PTFE backings made with pore formers (even when pressed at up to 5 tons in$^2$) yet have far superior electro-conductivity.

In accordance with this invention, the electrodes are usually made with the current distributor laminated on the backing layer side. Although not generally preferred, the current distributor may be laminated to the active layer side of the electrode instead of to the backing layer side.

EXAMPLE 3

(Prefered process of preparing PTFE/SB Wetproofing Layer)

Fifteen and four-tenths (15.4) grams of "Shawinigan Black" (SB) which had been previously fluffed up by placing in a high speed coffee chopper for 5 seconds, was added to 900 cc of deionized water having a temperature of 80°–85° C. in an ultrasonic (cleaning) bath also provided with mechanical stirring and sonically treated, with mechanical stirring, for 20 minutes. Six and eight-tenths (6.8) cc of TEFLON 30 dispersion (63% solids) was diluted with 289 cc of deionized water, in a separatory funnel. This TEFLON dispersion was then added dropwise over a 45 minute period to the SB/water dispersion with both sonic treatment and mechanical stirring continuing throughout this period and for one additional hour. The resulting SB/TEFLON dispersion was then filtered and washed three times with isopropyl alcohol to remove substantially all the water. The resulting water free material was vigorously stirred in isopropyl alcohol and then filtered to form a layer on a flat Whatman No. 1 filter paper which had been previously treated with a salt mixture containing about equimolar proportions of $Na_2CO_3$ and $NaHCO_3$. The resulting layer and salt treated filter paper were removed as a unit and dried at 110° C. to remove all of the isopropyl alcohol with the current distributor placed on the filtered layer and the assembled layers held under pressure to form a composite sheet. Next the unit was washed with deionized water to remove the salt treated filter paper and cleanse the composite sheet free of salt. This resulting clean composite sheet was then dried at 115° C. for one hour and then heat treated at 300° C. for one hour, in the open air, to drive off the wetting agent present from the original TEFLON dispersion. The composite sheet was then hot pressed at 350° C. and 200 psi to form a PTFE/SB wetproofing sheet of the present invention.

EXAMPLE 4

(This example illustrates the use of graphite fibers in preparing a PTFE/SB Wetproofing Layer)

The wetproofing sheet of this example was prepared following the procedure of Example 3, with the exception that 22 g of 0.5 mm graphite fibers manufactured by Fiber Materials, Inc. of Biddeford, Me., were added to the SB/TEFLON mixture before vigorously stirring in isopropyl alcohol and filtering the mixture, to form the layer as described in Example 3.

What is claimed is:

1. A method for preparing an electrically conductive, hydrophobic, gas permeable, cohesive, self-sustaining wetproofing sheet for use in forming an oxygen cathode, comprising:
   (a) introducing a fine particle sized carbon black into water to form a first dispersion thereof,
   (b) introducing polytetrafluoroethylene particles of about 0.05 to 0.5 microns into water containing a wetting agent agent to form a second dispersion thereof,
   (c) mixing said first dispersion with said second dispersion to form a third dispersion,
   (d) filtering said third dispersion to obtain a wet mass of mixed particles,
   (e) heating said wet mass to produce a dried mass containing said carbon black, and polytetrafluoroethylene particles and residual wetting agent,
   (f) removing said residual wetting agent from said mass by solvent extraction and/or further heating,
   (g) chopping said mass to form it into a granular mix, and
   (h) introducing said granular mix between pressing rollers heated to about 65° to 95° C. to form same into said wet-proofing sheet.

2. The method of claim 1 wherein fibers are introduced into one of said dispersions in steps (a), (b) or (c).

3. The method of claim 2 wherein said fibers are carbon graphite fibers.

4. A method for preparing an electrically conductive, hydrophobic, gas permeable, cohesive, self-sustaining wet proofing sheet for use in forming an oxygen cathode, comprising:
   (a) introducing a fine particle sized carbon black into water to form a first dispersion thereof,
   (b) introducing polytetrafluoroethylene particles of about 0.05 to 0.5 microns into water containing a wetting agent to form a second dispersion thereof,
   (c) mixing said first dispersion with said second dispersion to form a third dispersion,
   (d) filtering said third dispersion to obtain a wet mass of mixed particles,
   (e) washing said wet mass with alcohol to render it substantially water-free and with some residual wetting agent,
   (f) dispersing said substantially water-free mass in alcohol,
   (g) filtering the resultant dispersion in alcohol from step (f) through a salt bed deposited on a flat filter to form thereon a layer of said mixed particles including some residual wetting agent,
   (h) heating and drying said layer and said filter,
   (i) washing said dried layer and filter with water to remove said filter from said layer and to clean said layer of salt, leaving a salt-free layer of said mixed particles,
   (j) heating and drying said salt-free layer,
   (k) heating said layer to a temperature higher than in step (j) to drive off said wetting agent, and
   (1) pressing said layer at elevated pressure and temperature to bond and form the mixed particles therein into said wetproofing sheet.

5. The method of claim 4 wherein fibers are introduced into one of the dispersions in steps (a), (b), (c) or (f).

6. The method of claim 5 wherein said fibers are carbon graphite fibers.

7. The method of claim 4 or 5 wherein said salt bed is produced from an equimolar mixture of sodium carbonate and sodium bicarbonate.

8. The method of claim 1 or 2 or 4 or 5 wherein said carbon black partical size is about 50–3000 Angstroms and its true density is about 1.95 grams per cubic centimeter.

9. An electrically conductive, hydrophobic, gas permeable, cohesive, self-sustaining wetproofing sheet produced by the method of claim 1 or 2 or 4 or 5.

* * * * *

UNITED STATES PATENT AND TRADEMARK OFFICE
CERTIFICATE OF CORRECTION

PATENT NO. : 4,468,362
DATED : August 28, 1984
INVENTOR(S) : Frank Solomon

It is certified that error appears in the above-identified patent and that said Letters Patent are hereby corrected as shown below:

Column 4, line 44, delete "Blace", and insert therefor --Shawinigan Black--.

In Claim 1, column 8, line 1, delete the word "agent", second occurrence.

In claim 8, column 8, line 62, delete the word "partical" and insert --particle--.

Signed and Sealed this

Twelfth Day of March 1985

[SEAL]

Attest:

DONALD J. QUIGG

Attesting Officer     Acting Commissioner of Patents and Trademarks